(12) United States Patent
Contreras

(10) Patent No.: US 12,247,158 B2
(45) Date of Patent: Mar. 11, 2025

(54) SUSTAINABLE NON-HYDRAULIC CEMENT COMPOSITION AND METHODS OF SUCH CEMENTS IN SUBTERRANEAN CEMENTING OPERATIONS

(71) Applicant: Saudi Arabian Oil Company, Dhahran (SA)

(72) Inventor: Elizabeth Q. Contreras, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/892,766

(22) Filed: Aug. 22, 2022

(65) Prior Publication Data
US 2024/0084185 A1 Mar. 14, 2024

(51) Int. Cl.
| | |
|---|---|
| *E21B 33/14* | (2006.01) |
| *C04B 24/12* | (2006.01) |
| *C04B 28/00* | (2006.01) |
| *C04B 40/02* | (2006.01) |
| *C09K 8/467* | (2006.01) |

(52) U.S. Cl.
CPC ............ *C09K 8/467* (2013.01); *C04B 24/122* (2013.01); *C04B 28/00* (2013.01); *C04B 40/0231* (2013.01); *E21B 33/14* (2013.01)

(58) Field of Classification Search
CPC ................................ C09K 8/467; E21B 33/14
USPC .......................................................... 166/292
See application file for complete search history.

(56) References Cited

U.S. PATENT DOCUMENTS

| | | | | |
|---|---|---|---|---|
| 6,572,697 | B2* | 6/2003 | Gleeson ................. | C04B 28/04 |
| | | | | 106/737 |
| 9,512,346 | B2* | 12/2016 | Roddy .................... | C09K 8/467 |
| 10,150,700 | B2* | 12/2018 | Wu ........................ | C04B 28/003 |
| 10,947,437 | B2* | 3/2021 | Contreras ........... | C04B 20/0016 |
| 2015/0122494 | A1* | 5/2015 | Vo ........................... | C09K 8/805 |
| | | | | 166/305.1 |

FOREIGN PATENT DOCUMENTS

| | | | |
|---|---|---|---|
| WO | 2013085412 A1 | 6/2013 | |
| WO | 2018077468 A1 | 5/2018 | |

* cited by examiner

*Primary Examiner* — Zakiya W Bates
*Assistant Examiner* — Ashish K Varma
(74) *Attorney, Agent, or Firm* — DINSMORE & SHOHL LLP

(57) ABSTRACT

A method of producing a cementitious material includes combining a reaction mixture to form a slurry and curing the slurry to form the cementitious material. The reaction mixture may include a mineral mixture, an organic compound, and $CO_2$. The mineral mixture may include calcium and the organic compound may be 3,4-dihydroxyphenethylamine, methyl salicylate, or both.

20 Claims, 8 Drawing Sheets

SUSTAINABLE NON-HYDRAULIC CEMENT COMPOSITION AND METHODS OF SUCH CEMENTS IN SUBTERRANEAN CEMENTING OPERATIONS

TECHNICAL FIELD

Embodiments of the present disclosure generally relate to cement compositions and their methods of production.

BACKGROUND

The present disclosure relates to the production of alternatives to ordinary hydraulic Portland cement. Hydraulic cements are used in the construction of oil and gas wells penetrating subterranean formations. Cements are necessary because they provide improved bonding and resistance to shattering under the impact of field operations. They are also used to form a seal between the wellbore and the formation.

However, conventional cements pose serious pollution and resource concerns. Cement manufacturing requires the production of a cement precursor called clinker. Clinker is produced through sintering of a blend of inorganics, such as limestone and aluminosilicates. This energy intensive sintering process results in over eight percent of worldwide carbon emissions. The inorganics are sintered at over 1400° C. to form the four mineral phases of $Ca_3Si$, $Ca_2Si$, $Ca_3Al$, and $Ca_4AlFe$. The produced clinker is then mixed with other minerals and significant quantities of fresh water, to form a slurry. In many environments, the water usage can become prohibitive as well.

Accordingly, there remains a need for methods of cement production which minimize or eliminate the release of carbon dioxide.

BRIEF SUMMARY

Embodiments of the present disclosure address this need for sustainable, low carbon cement by providing for methods of producing cementitious material which incorporates free carbon dioxide, thereby reducing carbon emissions and sequestering the carbon dioxide within cured cement.

In accordance with one embodiment of the present disclosure, a method of producing a cementitious material may comprise combining a reaction mixture to form a slurry and curing the slurry to form the cementitious material. The reaction mixture may comprise a mineral mixture, an organic compound, and $CO_2$.

In accordance with another embodiment of the present disclosure, a method of producing a cementitious material may comprise combining a reaction mixture to form a slurry and curing the slurry to form the cementitious material. The reaction mixture may comprise a calcium salt, an organic compound, and $CO_2$. The organic compound may comprise one or both of 3,4-dihydroxyphenethylamine and methyl salicylate.

Although the concepts of the present disclosure are described herein with primary reference to carbonate based cements, it is contemplated that the concepts will enjoy applicability to any carbon dioxide based materials. Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of specific embodiments of the present disclosure may be best understood when read in conjunction with the following drawings, where like structure is indicated with like reference numerals and in which:

DETAILED DESCRIPTION

Figure 1:
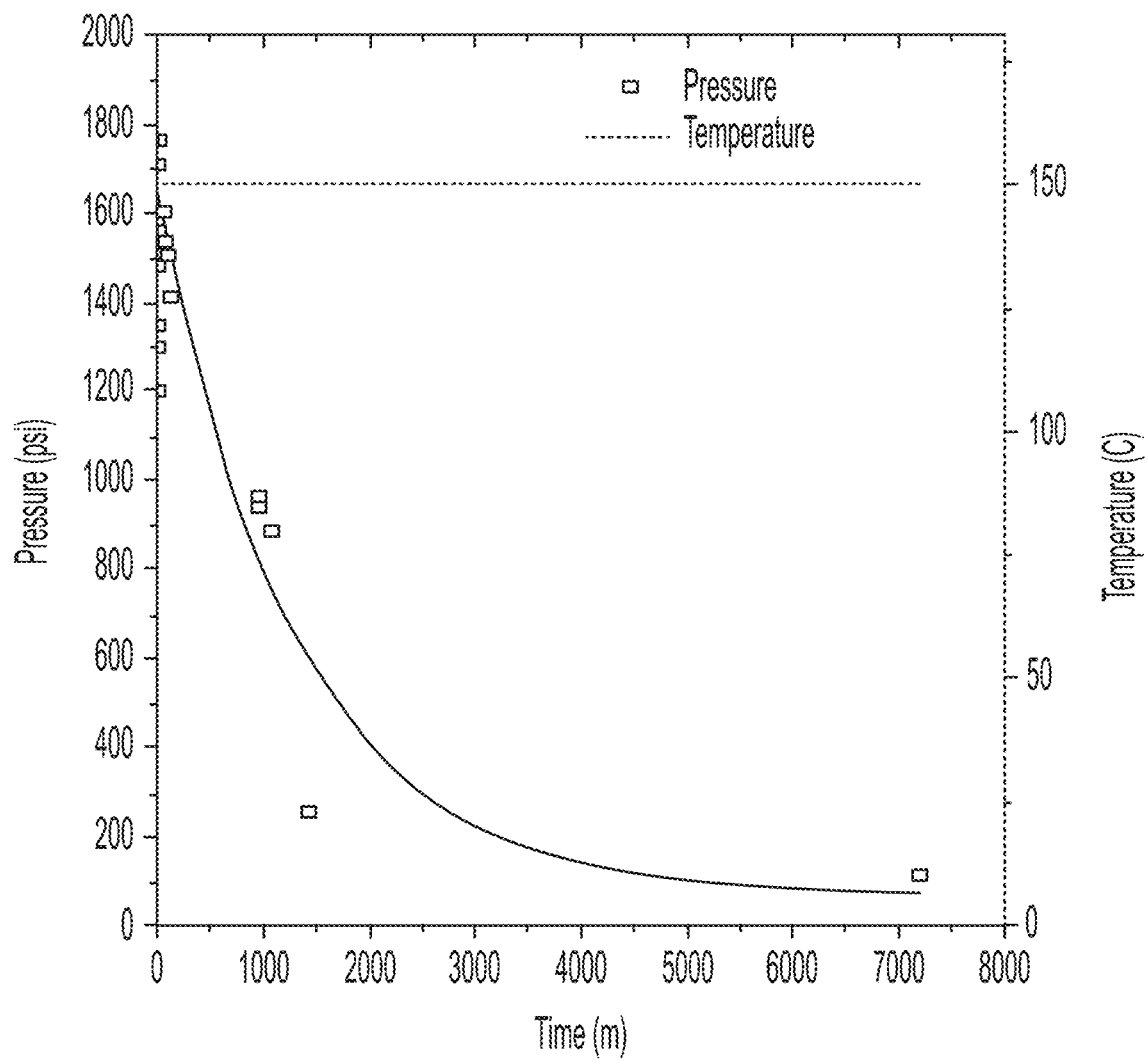
FIG. 1 is a graphical depiction of the $CO_2$ pressure over time, during the reaction of Example 1.

Embodiments of the present disclosure are directed to methods of producing a cementitious material.

As used throughout this disclosure, the term "curing" refers to the reactivity between $CO_2$ and settable starting reagents at temperature, pressure, and time to allow a wellbore fluid to set and achieve the desired properties (such as hardness) for its intended use through one or more reactions between water and a cementitious material.

As used throughout this disclosure, the terms "downhole" and "uphole" may refer to a position within a wellbore relative to the surface, with uphole indicating direction or position closer to the surface and downhole referring to direction or position farther away from the surface.

As used throughout this disclosure, the term "drying" refers to merely allowing a slurry to achieve a moisture condition appropriate for its intended use, which may only involve physical state changes, as opposed to chemical reactions.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability. The subsurface formation may also define void space as observed as fractures or vugs in the wellbore wall.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, embodiments herein are directed methods of producing a cementitious material. A method of producing the cementitious material may include combining a reaction mixture to form a slurry and curing the slurry to form the cementitious material. The reaction mixture may include a mineral mixture, an organic compound, and $CO_2$. The cementitious material may then be placed into a wellbore, such as those within a hydrocarbon-bearing formation.

Combining the reaction mixture may include placing all the reaction mixture ingredients in a single container. The combining step may further include mechanical mixing, such as stirring, shaking, spinning, mixing in a revolving drum, or bubbling $CO_2$ through the rest of the mixture. The ingredients may be mixed all at once or everything besides the $CO_2$ or other solvent may be mixed, before the addition of $CO_2$, $CO_2$ precursors, or the solvent. In embodiments, combining the reaction mixture may further include allowing the constituents of the reaction mixture to react in a precipitation reaction.

In specific embodiments, the mineral mixture may include calcium. Accordingly, the calcium salts in the mineral mixture may include precipitated salts of sea water, $CaCl_2$, $Ca(NO_3)_2$, $Ca(OH)_2$, or combinations thereof. The mineral mixture may include at least 15 weight percent ("wt. %") calcium, at least 30 wt. % calcium, at least 40 wt. % calcium, at least 50 wt. % calcium, at least 60 wt. % calcium, at least 70 wt. % calcium, at least 80 wt. % calcium, at least 90 wt. % calcium, at least 95 wt. % calcium, even at least 99 wt. % calcium, as calculated on the dry weight of calcium salts over all salts. In embodiments, the ratio of calcium species to $CO_2$ may be 1:1. It is contemplated that this ratio creates a balanced reaction between the calcium and carbon dioxide species to form carbonate precipitates that may make up the cementitious material.

According to some embodiments, the mineral mixture may be derived from seawater, saline-alkali solutions, or both. For example, the mineral mixture may be seawater or a brine derived from seawater. Alternately, the mineral mixture may be a dried seawater extract, such as sea salts.

The slurry may include from 20 to 90 wt. % of the mineral mixture, based on the total weight of the slurry. For example, the slurry may include from 20 to 80 wt. %, from 20 to 70 wt. %, from 20 to 60 wt. %, from 20 to 50 wt. %, from 20 to 40 wt. %, from 20 to 30 wt. %, from 30 to 90 wt. %, from 30 to 80 wt. %, from 30 to 70 wt. %, from 30 to 60 wt. %, from 30 to 50 wt. %, from 30 to 40 wt. %, from 40 to 90 wt. %, from 40 to 80 wt. %, from 40 to 70 wt. %, from 40 to 60 wt. %, from 40 to 50 wt. %, from 50 to 90 wt. %, from 50 to 80 wt. %, from 50 to 70 wt. %, from 50 to 60 wt. %, from 60 to 90 wt. %, from 60 to 80 wt. %, from 60 to 70 wt. %, from 70 to 90 wt. %, from 30 to 80 wt. %, from 40 to 70 wt. %, from 60 to 60 wt. %, or any subset thereof, of the mineral mixture, based on the total weight of the slurry. It should be understood that wt. % of mineral mixture in the slurry may be calculated as wt.

$$\% = \frac{\text{mineral mixture}}{\text{total slurry weight}}.$$

The slurry may include disassociated ions. For example, the slurry may include one or more of $Zn^{2+}$, $Pb^{2+}$, $Cl^-$, $SO_4^{2-}$, $F^-$, $Br^-$, $Li^+$, $Na^+$, $K^+$, $Mg^{2+}$, $Ca^{2+}$, $Sr^{2+}$, $Ba^{2+}$, or $Fe^{2+}$. The slurry may include at least 0.5 wt. %, at least 1 wt. %, at least 2 wt. %, at least 5 wt. %, at least 10 wt. %, at least 15 wt. %, at least 20 wt. %, at least 25 wt. %, at least 40 wt. %, at least 60 wt. %, or even at least 80 wt. %, of the disassociated ions.

The slurry and the reaction mixture may each include $CO_2$. The $CO_2$ may be present as a gas, a supercritical fluid, or as inorganic carbons. In some specific embodiments, the $CO_2$ may be present as a gas. In embodiments where the $CO_2$ is present as a supercritical fluid, it may serve as a solvent to form the slurry. In embodiments where $CO_2$ may be present as inorganic carbons, the inorganic carbons may be carbonates, bicarbonate salts, carbonate esters, carbonic acids, or combinations thereof. As previously stated, the $CO_2$ may be present in the form of carbonic acid or supercritical $CO_2$. Also as previously stated, the reaction mixture may also include a solvent, including but not limited to water. The reaction mixture may also include a hydroxide, such as sodium hydroxide or calcium hydroxide. The hydroxides may operate to neutralize the carbonic acid, if the carbonic acid is present in the reaction mixture. In embodiments, the $CO_2$ used herein may be obtained from multiple sources. For example, the $CO_2$ may be obtained from recycling from industrial manufacturing processes, acquired commercially, or sequestered from the atmosphere as a greenhouse gas. For example, the $CO_2$ may also be recovered from sweet gas obtained from hydrocarbon production or from cement manufacturing (from sintering) waste streams.

The slurry may include from 10 to 80 wt. % of the $CO_2$, based on the total weight of the slurry. For example, slurry may include from 10 to 70 wt. %, from 10 to 60 wt. %, from 10 to 50 wt. %, from 10 to 40 wt. %, from 10 to 30 wt. %, from 10 to 20 wt. %, from 20 to 80 wt. %, from 20 to 70 wt. %, from 20 to 60 wt. %, from 20 to 50 wt. %, from 20 to 40 wt. %, from 20 to 30 wt. %, from 30 to 80 wt. %, from 30 to 70 wt. %, from 30 to 60 wt. %, from 30 to 50 wt. %, from 30 to 40 wt. %, from 40 to 80 wt. %, from 40 to 70 wt. %, from 40 to 60 wt. %, from 40 to 50 wt. %, from 50 to 80 wt. %, from 50 to 70 wt. %, from 50 to 60 wt. %, or any subset thereof, of the $CO_2$, based on the total weight of the slurry. The wt. % of the $CO_2$ in the slurry may be calculated as wt.

$$\% = \frac{CO_2 \text{ weight}}{\text{Total Slurry Weight}}.$$

According to some embodiments, the $CO_2$ may be introduced to the reaction mixture as a gas. Gaseous $CO_2$ may be introduced to the reaction mixture in a biphasic way, wherein the $CO_2$ gas sits above the reaction mixture and diffuses down into the reaction mixture. The reaction mixture may be mechanically mixed to increase mixing rates. In some embodiments, the $CO_2$ may be bubbled through the reaction mixture. The $CO_2$ may first be dissolved in a solvent, such as water, before adding the solvent/$CO_2$ mixture to the reaction mixture.

The gaseous $CO_2$ may contact the reaction mixture at a partial pressure of at least 14.7 pound per square inch (psi). For example, the gaseous $CO_2$ may contact the reaction mixture at a partial pressure of at least 14.7 psi, at least 15 psi, at least 100 psi, from 14.7 psi to 1200 psi, from 100 psi to 3000 psi, or any subset thereof.

The molar ratio of calcium to $CO_2$ in the slurry may be from 0.9:1 to 1.3:1. For example, the molar ratio of calcium to $CO_2$ in the slurry may be from is 0.9:1 to 1.2:1, from 0.9:1 to 1.15:1, from 1:1 to 1.3:1, from 1:1 to 1.2:1, from 1:1 to 1.15:1, from 1.1:1 to 1.3:1, from 1.1:1 to 1.2:1, or any subset thereof.

As previously stated, the reaction mixture may include a solvent. For example, the solvent may include one or more of water, alcohol, glycerol, or super critical carbon dioxide. It should be understood that the solvent may be super critical carbon dioxide and thus the solvent may be the same component as the $CO_2$. Supercritical $CO_2$ may be chosen in order to facilitate the development of net-zero carbon emission cementitious materials.

In embodiments where the solvent is water, the reaction mixture may include from 10 to 50 wt. % solvent. For example, the reaction mixture may include from 20 to 40 wt. %, from 30 to 35 wt. %, from 10 to 40 wt. %, from 10 to 35 wt. %, from 20 to 50 wt. %, from 30 to 50 wt. %, or any subset thereof, of solvent. In embodiments where the solvent includes water, a pH of the water may be from 7.8 to 12. For example, the pH of the water may be from 7.8 to 12, from 7.8 to 8.5, from 8.5 to 12, from 9 to 12, from 10.5 to 12, from 11 to 12, from 8.5 to 11, from 8.5 to 10, from 8.5 to 9, from 9 to 11.5, from 10 to 11, or any subset thereof.

The reaction mixture may also include an ammonium compound. For example, the ammonium compound may include $NH_4OH$. The reaction mixture may include from 1 to 10 wt. %, from 1 to 8 wt. %, from 2 to 10 wt. %, from 5 to 10 wt. %, from 6 to 10 wt. %, from 6 to 8 wt. %, or any subset thereof, of the ammonium compound.

As previously stated, the reaction mixture may include an organic compound. The organic compound may include one or more of 3,4-dihydroxyphenethylamine, sodium salicylate, methyl salicylate, salicyclic acid, chitin, chitosan, pentetic acide, (polypropylene glycol)-diol, poly(propylene glycol) monobutyl ether, N,N'-Bis(salicylidene)-ethylenediamine, 5,5'-methylenedisalicylic-acid, 1-methyl-trimethylene-disalicylate, lithium bis(trifluoromethylsulfonyl)imide, N-(3-sulfopropyl)-N-methacroyloxyethyl N,N-dimethylammonium betaine, poly(propylene glycol) acetate, poly(ether carbonate), poly(methyl acrylate), poly(vinyl acetate), poly(dimethylsiloxane), cellulose triacetate, cyclodextrin, poly(lactic acid), glucopyranoside, pluronics, poly(propylene glycol), or derivatives thereof. According to specific embodiments, the organic compound may include 3,4-dihydroxyphenethylamine, methyl salicylate, or both. The organic compounds may be used to control the rate of reactivity to form, degree of crosslinking, homogeneity, and density of the cementitious material.

The slurry may include from 10 to 50 wt. % of the organic compound, based on the total weight of the slurry. For example, the organic compound may include from 15 to 40 wt. %, from 20 to 35 wt. %, from 25 to 30 wt. %, from 10 to 40 wt. %, from 10 to 30 wt. %, from 20 to 50 wt. %, from 25 to 50 wt. %, or any subset thereof, of the total weight of the slurry.

The weight ratio of the organic compound to the mineral mixture may be from 10:90 to 90:10. For example, the weight ratio of the organic compound to the mineral mixture may be from 10:90 to 20:80, from 10:90 to 30:70, from 10:90 to 60:40, from 10:90 to 50:50, from 20:80 to 90:10, from 30:70 to 90:10, from 40:60 to 90:10, from 50:50 to 90:10, from 20:80 to 80:20, from 30:70 to 70:30, from 40:60 to 60:40, or any subset thereof.

The molar ratio of calcium to organic compound in the slurry may be at least 1:1. For example, the molar ratio of calcium to organic compound in the slurry may be at least 1:1.5, at least 1:2, at least 1:3, from 1:1 to 1:5, from 1:2 to 1:5, from 1:1 to 1:4, from 1:1 to 1:3, or any subset thereof. In some specific embodiments, the molar ratio of calcium to 3,4-dihydroxyphenethylamine may be at least 1:2.

The optimum amount of each component of the slurry may be dependent on balanced chemical equations of the reactant mixture. For example, where the reaction mixture includes at least calcium salts, ammonium compounds, and $CO_2$, the balanced chemical equation for the slurry and the slurry itself may include approximately 50 wt. % mineral mixture, approximately 20 wt. % $CO_2$, and approximately 30 wt. % organic compound.

The reaction mixture may also include at least one recycled material. For example, the recycled materials may include one or more of coal fly ash, wood biomass ash, rice flake ash, sugar cane ash, silica fume, silica powder, fumed silica, steel slag, copper slag, zinc slag, ferronickel slag, red mud, sewage sludge, paper sludge, stone sludge, metakaolin, limestone, phosphogypsum, cement kiln dust, and dolomite. In embodiments, the reaction mixture may include up to 1 wt. %, up to 5 wt. %, up to 10 wt. %, up to 20 wt. %, up to 30 wt. % or up to 35 wt. % recycled materials.

As discussed above, the method of producing the cementitious material may include curing the slurry. Curing the slurry may include heating and pressurizing the slurry to a curing pressure and temperature. The curing pressure may be at least 200 psi. For example, the curing pressure may be at least 400 psi, at least 800 psi, at least 1200 psi, from 200 psi to 2,000 psi, from 200 psi to 1800 psi, from 200 psi to 1600 psi, from 200 psi to 1400 psi, from 400 psi to 2000 psi, from 400 psi to 1600 psi, from 800 psi to 2000 psi, from 800 psi to 1600 psi, from 800 psi to 1200 psi, from 1200 psi to 2000 psi, from 1200 psi to 1600 psi, or any subset thereof. The curing pressure may be defined as the sum of all the partial pressures of all the gasses contacting the slurry. In embodiments where bulk gasses are not contacting the slurry, the curing pressure may be defined as the hydraulic pressure exerted on the slurry.

The curing pressure may be produced by a curing atmosphere. The curing atmosphere may include carbon dioxide. At least 50 mol. %, at least 60 mol. %, at least 70 mol. %, at least 80 mol. %, at least 90 mol. %, at least 95 mol. %, at least 99 mol. %, or even at least 99.9 mol. % of the curing atmosphere may be carbon dioxide.

The curing temperature may be from 22° C. to 200° C. For example, the curing temperature may be from 22° C. to 180° C., from 22° C. to 160° C., from 22° C. to 140° C., from 22° C. to 120° C., from 22° C. to 100° C., from 22° C. to 80° C., from 22° C. to 50° C., from 50° C. to 200° C., from 75° C. to 200° C., from 100° C. to 200° C., from 125° C. to 200° C., from 150° C. to 200° C., from 50° C. to 175° C., from 75° C. to 150° C., or any subset thereof.

The cementitious material of the present disclosure may have a glass transition temperature of at least 400° C., at least 500° C., at least 600° C., at least 700° C., or at least 740° C. Glass transition temperature may be measured according to ASTM E2602. The cementitious material may also have a crush strength of at least 1500 psi. For example, the cementitious material may have a crush strength of at least 500 psi, at least 1000 psi, at least 2000 psi, at least 2500 psi, at least 3000 psi, at least 3500 psi or at least 4000 psi. Crush strength may be measured according to API 2013 RP 10B-2, Recommended Practice for Testing Well Cements, second edition, Washington, D.C.

The cementitious material may include precipitated carbonates. For example, the cementitious material may include precipitated $Ca(CO_3)_2$. For example, at least 30 wt. %, at least 40 wt. %, or at least 50 wt. % of the cementitious material may include precipitated $Ca(CO_3)_2$. Without being limited by theory, it is believed that the carbonates may be formed from the combination of the $CO_2$ and the mineral mixture. The cementitious material may also include precipitated $Mg(CO_3)_2$, or a combination of $Ca(CO_3)_2$ and $Mg(CO_3)_2$.

The cementitious material may also include inorganic additives. The inorganic additives may include calcium metasilicate, lithium sulfate, lithium carbonate, kaolin, calcium nitrate, calcium titanate, titanium oxide, alkali metal hetero-poly tungstates or combinations thereof. Smaller valent salts, such as lithium carbonate and lithium sulfate, may operate to lower the overall melting temperature of the cementitious material to facilitate fluidity as well as to make curing more sustainable at lower temperatures. In this manner, it is contemplated that the inclusion of smaller valent salts may lead to more high-solids, low-water cements. Alkaline metasilicates, kaolin, sodium tungstates, potassium tungstates, and titanates may operate to increase the resulting compressive strength of the cementitious material as well as reducing cement strength retrogression as temperature increases.

Methods of producing a cementitious material may also include methods of using the cementitious material. For example, the methods of producing a cementitious material may also generally occur during wellbore cementing operations. For example, the method may further include introducing a casing string into a wellbore. The casing string may include casing pipe. The casing string may additionally include, but may not be limited to, guide shoes, centralizers, float collars, top and bottom plugs, or combinations thereof. The various components of the casing string, except for the bottom plug, may each include an inner sidewall operable to transmit a fluid uphole to downhole through a cavity defined by the inner sidewalls. In embodiments including the casing string, the casing string and a wellbore wall of the wellbore may define an annular region between the casing string and the wellbore.

The method may also include injecting any of the slurries previously mentioned into the wellbore. Combining the reaction mixture may occur before injecting the slurry into the wellbore. In embodiments, the supercritical $CO_2$ or any of the other solvents discussed herein may be used as a carrier fluid to suspend the slurry in the wellbore. Following the introduction of the casing string into the wellbore, the slurry may be injected into the annular region; be allowed to cure within the annular region, be injected into the subsurface formation, be allowed to cure in the subsurface formation, or combinations thereof. Injecting the slurry into the subsurface formation may further include injecting the slurry into natural fractures, vugs, or both of the subsurface formation.

In embodiments, the slurry may be injected into the annular region by pumping the slurry into the cavity defined by the inner sidewalls of the casing string, to the bottom of the casing string, around the bottom of the casing string, into the annular region, or combinations thereof. Following the insertion of an appropriate amount of the slurry into the inner cavity of the casing string, in embodiments, a displacement fluid may be utilized to push the slurry out of the inner cavity of the casing string and into the annular region. The slurry may then be cured or otherwise allowed to harden, thereby setting the casing string in place. The cementitious materials produced herein may also be used for other wellbore operations, including but not limited to: cement squeeze jobs, sustainable cement sheaths, as lost circulation materials, or any other cementing operation generally recognized in the art.

EXAMPLES

Example 1

The individual components of a reaction mixture were first combined according to the proportions of Table 1 below. The reaction mixture was then placed into a Parr Instrument Company brand pressure vessel reactor "Parr reactor". The Parr reactor was then pressured up to 750 psi using a stream of the gaseous $CO_2$. The temperature was then slowly ramped to a maximum temperature of 150° C. from room temperature (20° C.) and held for 16 hours. The pressure observed at 150° C. was approximately 1,763 psi. The cementitious material was then removed and characterized using thermogravimetric analysis (TGA), according to embodiments herein.

TABLE 1

| Reaction Mixture and Reactor Conditions | |
|---|---|
| Component | Amount |
| $CaCl_2$ | 0.56 g |
| $Na_4OH$ | 2 mL |
| 3,4-dihydroxyphenethylamine | 0.08 g |
| $Ca(NO_3)_2$ | 17.6 g |
| Reactor Condition | Value |
| Initial pressure (psi) | 750 |
| Temperature (° C.) | 150 |
| Pressure at temperature (psi) | 1763 |
| Reaction time (h) | 16 |

Figure 2:
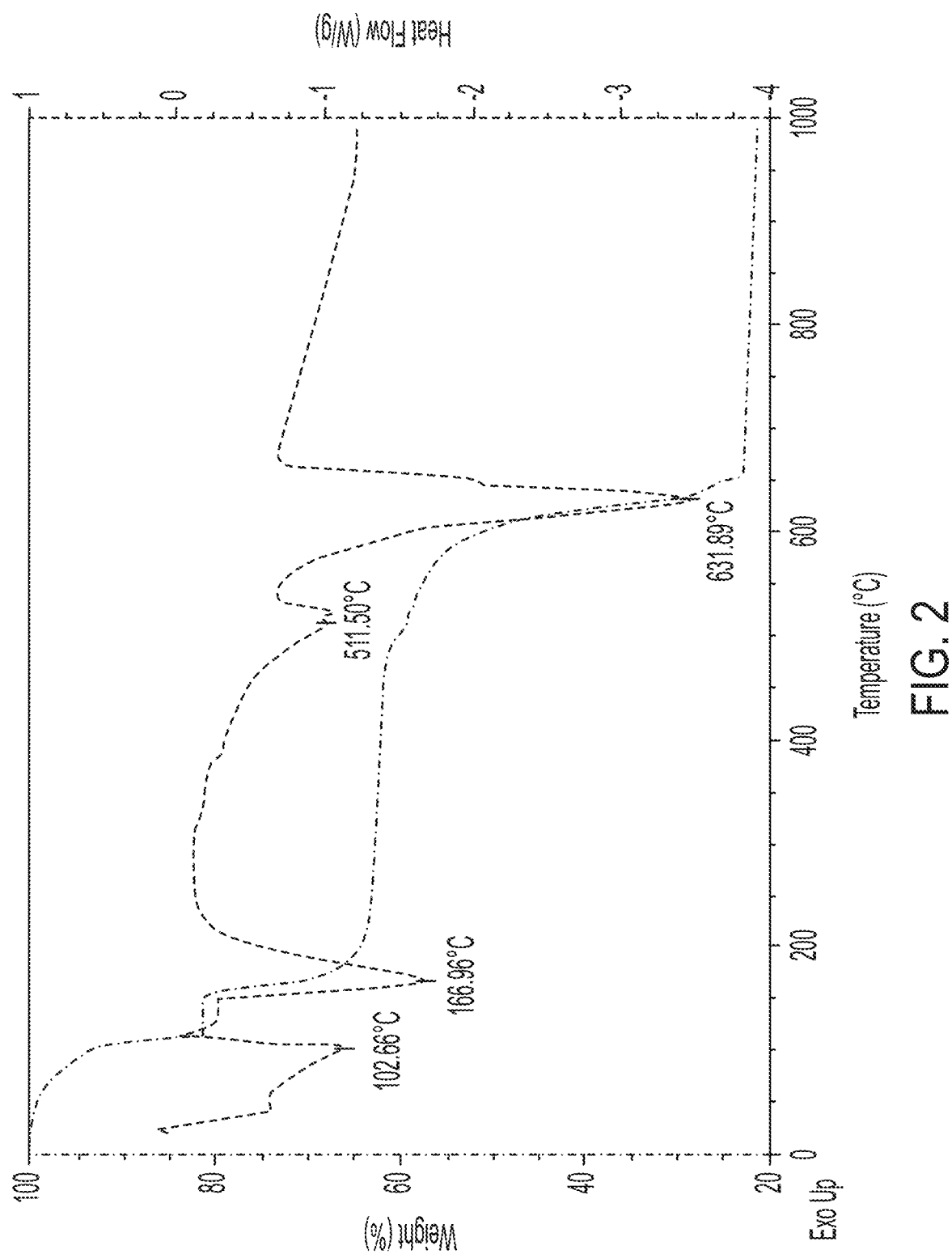
FIG. 2 is a graphical depiction of the thermogravimetric analysis of the products of Example 1.

As shown in FIG. 1, the decrease in pressure at a constant temperature of 150° C. indicates the near total sequestration of the $CO_2$ into the reaction mixture, resulting in the cementitious material. Without being limited by theory, it is believed that the reaction proceeded at least partly as $CaCl_2 + Ca(NO_3)_2 + 2NH_4OH + 2CO_2(g) \leftrightarrows 2CaCO_3(s) + 2NH_4Cl + 2HNO_3$. The cementitious material was also observed to subsequently set into a hard material resembling a cement with compressive strength, although no data on compressive strength was collected The products of Example 1 showed a dark, semi-opaque fluid with a high viscosity and no settling after one hour. As no water was introduced to the reaction mixture, the liquid making up part of the fluid was produced during the reaction with the $CO_2$. The liquid was made up of a nitric acid byproduct of the reaction, with a concentration of up to 68% in water. As is shown in FIG. 2, thermogravimetric analysis of the products of Example 1 showed significant weight loss of about 20 wt. %, at temperatures around 100° C.

Figure 3:
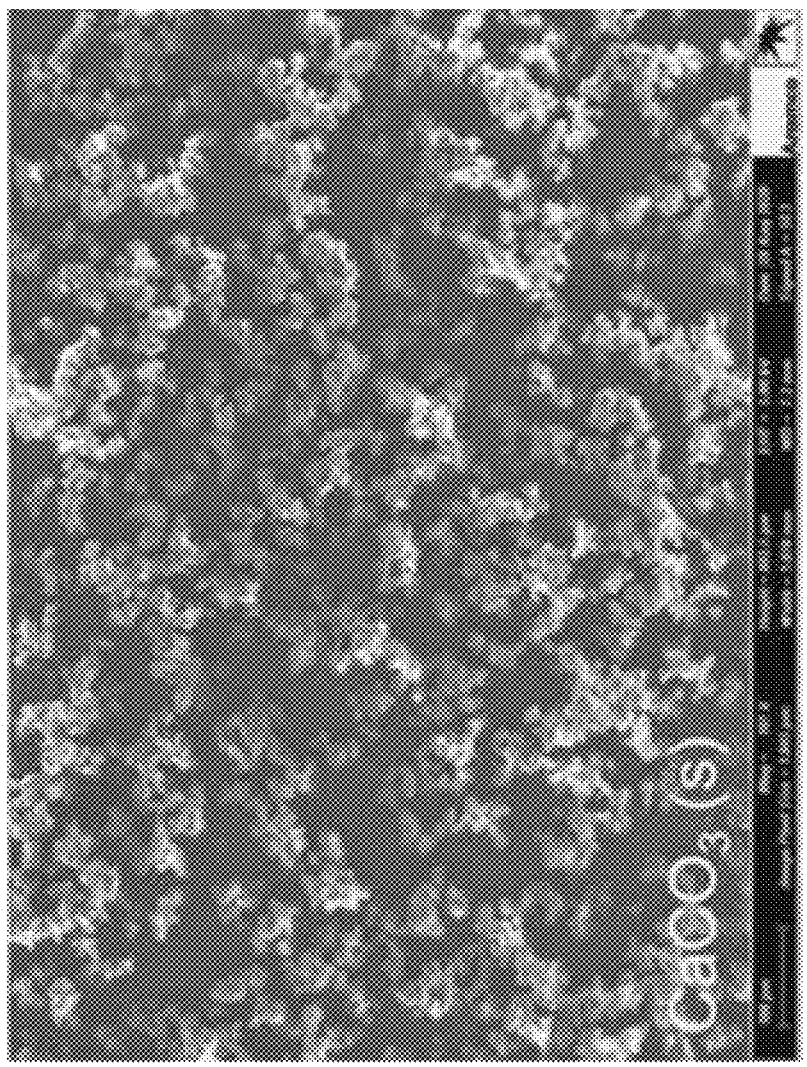
FIG. 3 is an electron micrograph of the calcium carbonate cementitious material produced in Example 2.
Figure 4:
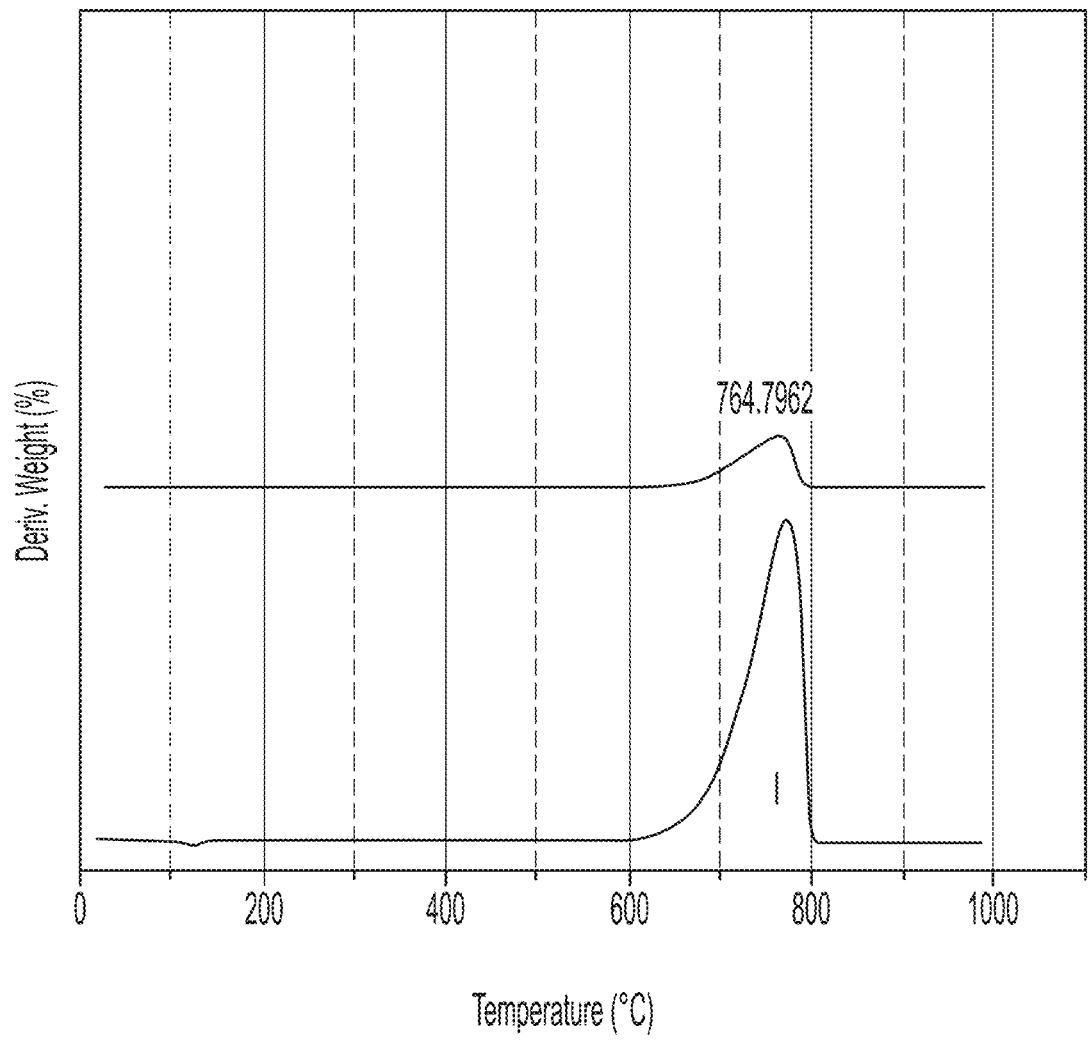
FIG. 4 is a derivative weight graph of a thermogravimetric analysis performed on the cementitious material produced in Example 2.

This weight loss was mainly attributable to the loss of water content from the fluid. More significant thermal degradation occurred in the 500 to 650° C. range, attributable to the thermal decomposition of the calcium carbonate formed as part of the cementitious material. The 500 to 650° C. degradation resulted in weight loss of about 40 percentage points from the original weight and nearly 70 percent from the weight at 400° C. Scanning electron microscope images of the formed carbonate can be seen in FIG. 3. The sample had a single TGA derivative weight peak at 764.8° C., as is shown in FIG. 4. This single peak indicates that nearly all of the reaction product was of a single moiety, particularly $CaCO_3$ in this case. The results of Example 1 show the general applicability of the methods herein to form a cementitious material from salts and $CO_2$ with beneficial properties without the problems or emissions associated with other common methods of forming cements, such as sintering of clinkers.

Example 2

In separate experiments, 1 g of NaCl, KCl, and CaOH was added to 5 mL of methyl salicylate and placed in a platinum crucible. Each platinum crucible was then placed in a thermogravimetric analyzer/calorimeter and exposed to pure $CO_2$ gas at a flow rate of 100 milliliters per min ("mL/min") for twenty minutes at room temperature and pressure. Additional trials were conducted for the CaOH at forty minutes reaction and sixty minutes reaction to determine the effect reaction time had on the reaction products.

Of the salts tested, only $Ca(OH)_2$ reacted with $CO_2$ to form carbonate. $Ca(OH)_2$ was found to be the best crosslinker to promote the co-polymerization of organic substrate binders with increased $CO_2$ sequestration, as is shown below. Without being limited by theory, it is believed that calcium salts are more effective crosslinkers than the other tested salts because of their ability to maintain a 2+ state of charge, such as that shown below in Table 2, which illustrates the exemplary crosslinks for K, Na, and Ca cementitious material networks.

TABLE 2

Exemplary Cementitious Material Crosslink Bonds for Varying Salts

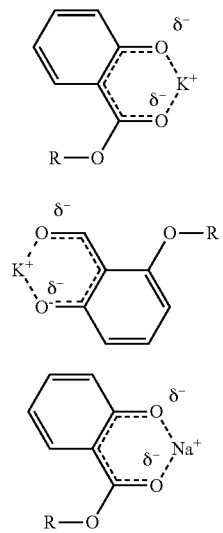

TABLE 2-continued

Exemplary Cementitious Material Crosslink Bonds for Varying Salts

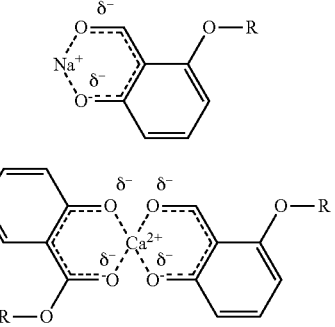

Controlled set rates were also achieved with reaction mixtures based on calcium mineral mixtures, and homogenous calcium pastes were formulated with defined dimensions for cementing applications. Set rate increased for these pastes with increasing total calcium content, increasing temperature, and decreasing organic monomer concentrations. In contrast, potassium and sodium based mineral mixtures exhibited difficult to control set rate kinetics, non-uniform structures, and often failed to set into a cementitious material.

Figure 5:
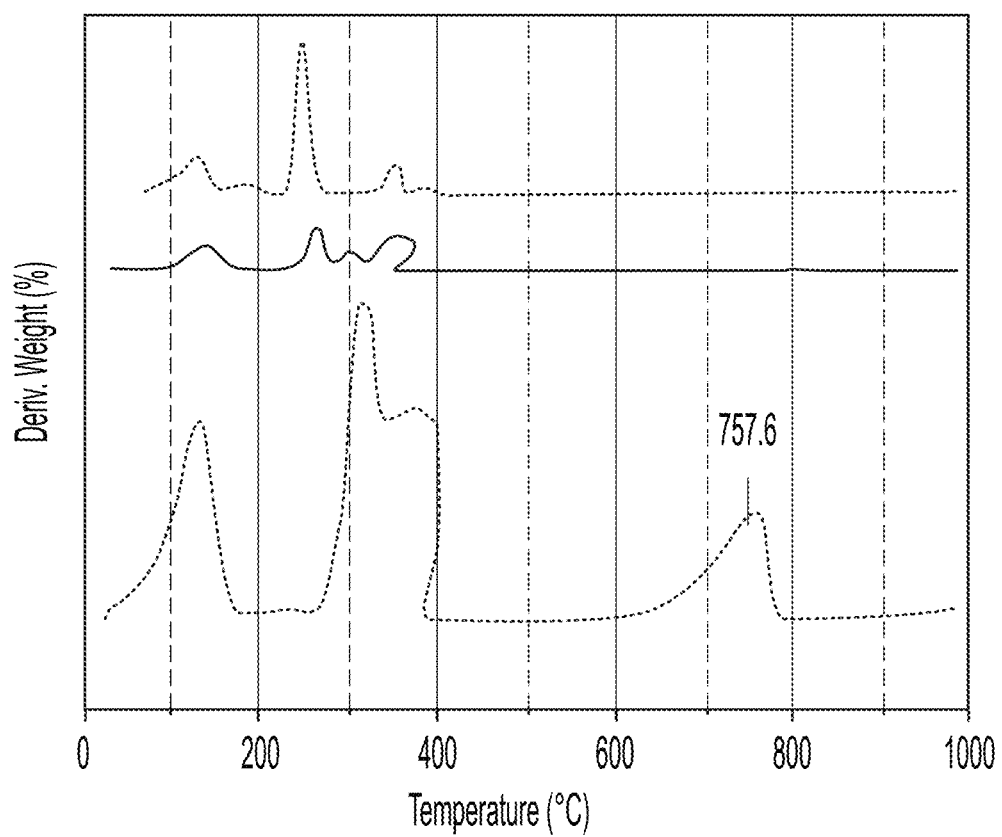
FIG. 5 is a thermogravimetric analysis of the reaction products of Example 3, showing K, Na, and Ca salts.

As is shown in FIG. 5, thermogravimetric analysis showed a four-stage decomposition including the removal of any bound produced water at 120° C. The TGA was conducted at a temperature ramp of 10° C./min up to 800° C. to measure the thermal degradation of the cementitious material produced. The $K^+$ and $Na^+$ carbonates showed decomposition processes at 250-265° C. Then, the thermal decomposition of the active substance, the anhydrous form, takes place in the temperature range of 300-400° C. No further decomposition is seen in these samples above 400° C., indicating that there are no highly crosslinked products. While the $Ca^{2+}$ carbonate is similar until 400° C., it shows significant decomposition in the range of 700-800° C. This indicates the presence of highly crosslinked calcium carbonate products, which may be suitable for use as cementitious materials.

Figure 6:
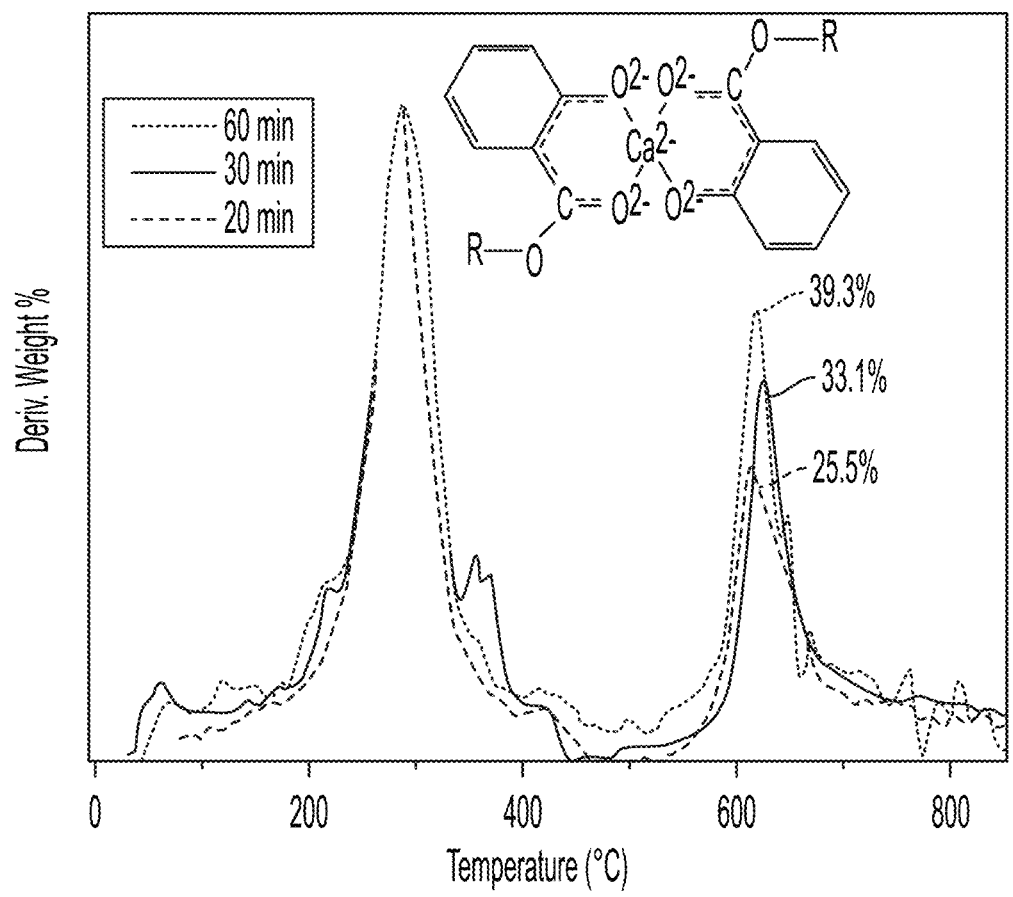
FIG. 6 is a thermogravimetric analysis of the reaction products of Example 3, showing different reaction times on a Ca salt.

FIG. 6 illustrates thermogravimetric analysis on the cementitious material of Example 3, after increases reaction times from 20 minutes to 40 and 60 minutes. As is shown in FIG. 6, increasing the reaction time resulted in increasing amounts of the product breaking down at over 600° C., rather than at the lower temperature of 200 to 400° C. This decomposition was still only observed in a single peak in the range of over 600° C. This indicates an increase of the more desired cementitious material with strong crosslink bonds form as reaction time increases. Also as illustrated in FIG. 6, for the sixty-minute reaction time, two glass transition temperatures were observed. Specifically, the peaks around 300° C. and 600° C., corresponding to $T_{g1}=290°$ C. and $T_{g2}=625°$ C.

Example 3

To analyze the effectiveness when seawater salts are used as the mineral mixture, a sea water stock solution according to the composition in Table 3 was added into 500 mL of water. The seawater solution was then combined with 25 grams of 3,4-dihydroxyphenethylamine and 25 grams of benzene-1,3,5-tricarboxylic acid. Similar to the conditions of Example 2, two seawater solutions of 35 mg were then placed in platinum crucibles and then exposed to pure $CO_2$ gas at a flow rate of 100 milliliters per min ("mL/min") for ten minutes and sixty minutes, respectively, at room temperature and pressure. TGA and differential scanning calorimetry (DSC) was then conducted at a temperature ramp of 10° C./min up to 800° C. to measure the thermal degradation of the cementitious material produced.

TABLE 3

Sea Water Mineral Mixture Composition:

| Component | Weight |
|---|---|
| $CaCl_2 \cdot H_2O$ | 4.41 g |
| NaCl | 146 g |
| KCl | 0.19 g |
| $BaCl_2 \cdot 2H_2O$ | 0.05 g |
| $MgCl_2 \cdot 6H_2O$ | 4.07 g |
| $SrCl_2 \cdot 6H_2O$ | 0.13 g |
| $NaHCO_3$ | 0.34 g |

Figure 7:
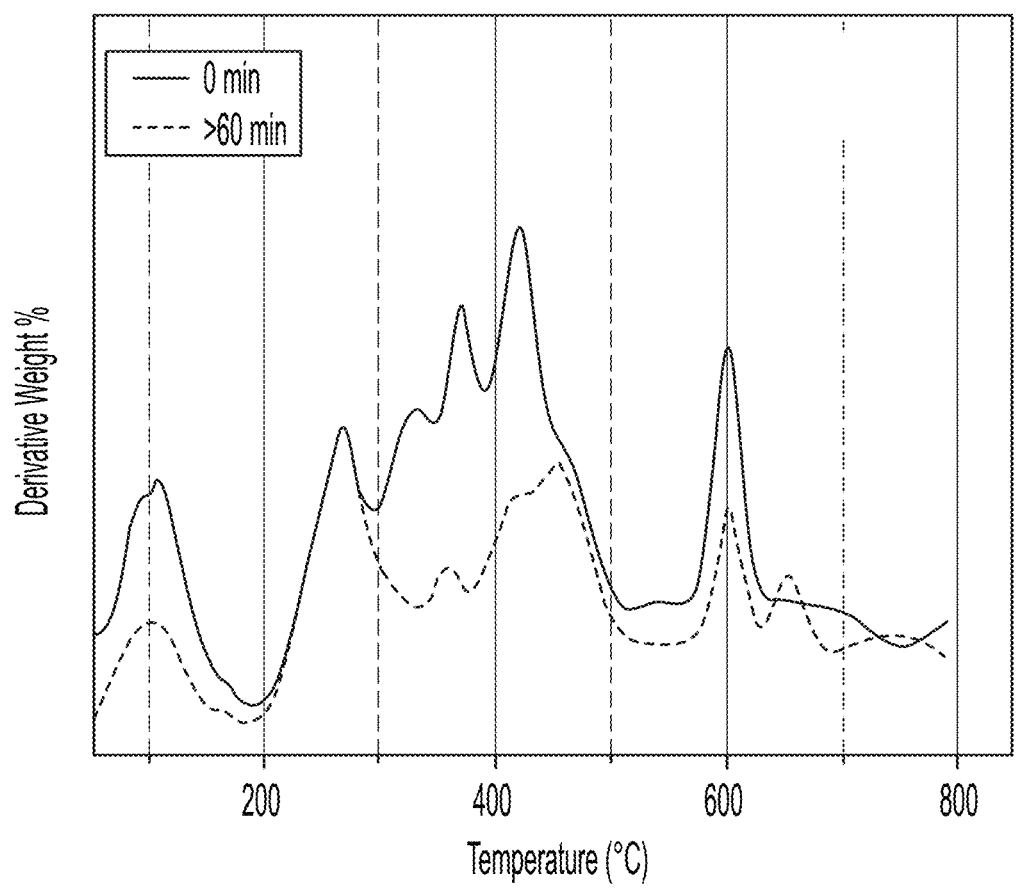
FIG. 7 is a thermogravimetric analysis of the reaction products of Example 4, when cementitious material is produced using a seawater-based formulation.

As is shown in FIG. 7, the cementitious material showed weight loss in the 60-120° C. range from water loss. However, the sharp peaks near 445° C. are new and correspond to the dehydroxlation and decarbonization of organic-inorganic $Ca^{2+}/Mg^{2+}$ polymer binary mixtures resulting from seawater salts such as $MgCl_2$ being present. The further peaks above 600° C. are understood to correspond to the decomposition of stable $CaCO_3$ moieties. However, as shown in FIG. 8, systems which include co-precipitation exhibit increased network connectivity and elevated glass transition temperatures.

Example 4

Two mL of the sea water stock solution above was added 300 µL of methyl salicylate and 30 mg NaOH. The solution was then mixed by stirring. To form the cementitious material, 35 mg of the sea water, NaOH, methyl salicylate mixture was then placed into the platinum crucible. The platinum crucible was then placed in a thermogravimetric analyzer/calorimeter and exposed to pure $CO_2$ gas at a flow rate of 100 milliliters per min ("mL/min") for sixty minutes at room temperature and pressure. Injection of CO2 gas was then stopped and TGA/DSC analysis was conducted as per the previous examples.

Figure 8:
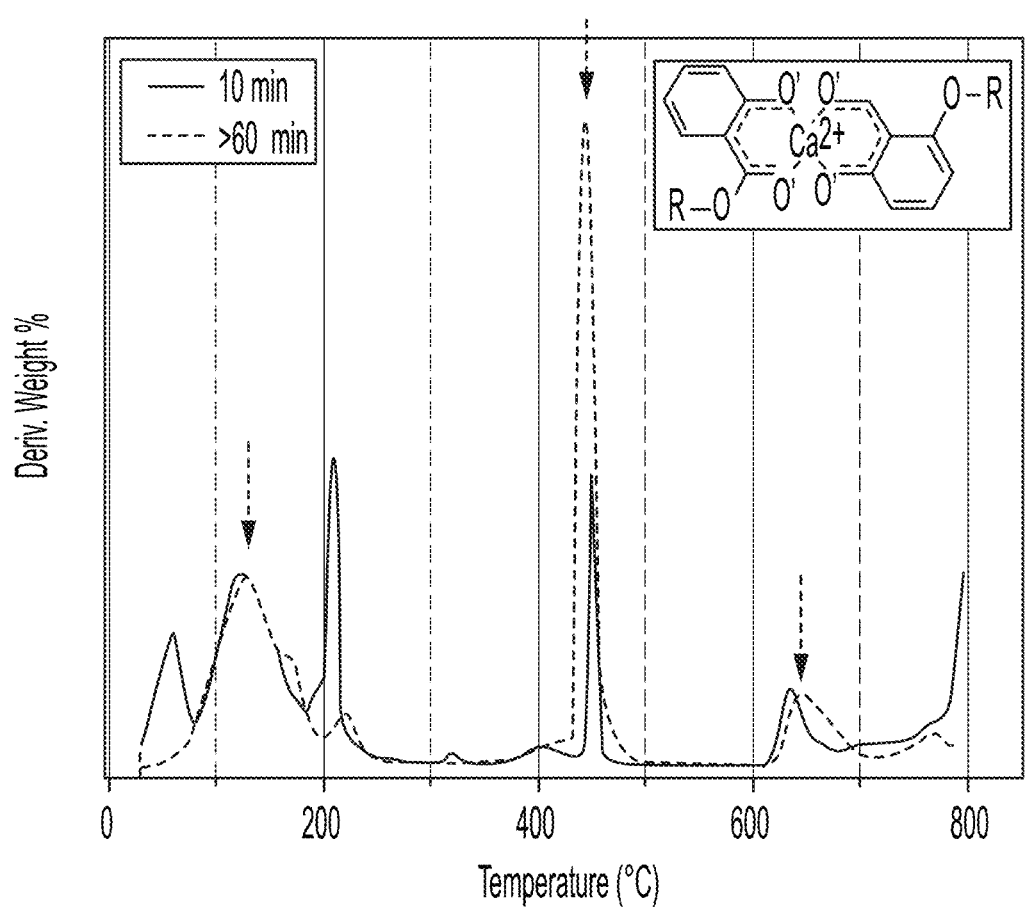
FIG. 8 is a thermogravimetric analysis of the reaction products of Example 5, when a cementitious material is produced using a seawater-based formulation.

As illustrated in FIG. 8, as compared to FIG. 7, the inclusion of methyl salicylate as an organic modifier resulted in at least two enhanced glass transition temperatures $T_{g1}$=443° C. and $T_{g2}$=644° C. (dashed arrows in FIG. 8). The addition of the methyl salicylate added new copolymer organic substrates to react with the $CO_2$ and the $Ca^{2+}/Mg^{2+}$ sea salts. The further peaks above 600° C. are understood to correspond to the decomposition of stable $CaCO_3$ moieties. In observing FIGS. 7 and 8, as compared to FIG. 6, the inclusion of co-precipitating $Ca^{2+}/Mg_{2+}$ sea salts exhibited increased network connectivity and elevated glass transition temperatures. The reactions in FIGS. 7 and 8 also resulted in conversion of 6 to 10 wt. % of the dissolved carbon dioxide into precipitated carbonates.

Aspects

In a first aspect of the present disclosure, a method of producing a cementitious material may comprise combining a reaction mixture to form a slurry and curing the slurry to form the cementitious material. The reaction mixture may comprise a mineral mixture an organic compound, and $CO_2$.

A second aspect of the present disclosure includes any preceding aspect, and wherein, the reaction mixture further comprises water.

A third aspect of the present disclosure includes any preceding aspect, and wherein, the reaction mixture further comprises an ammonium compound.

A fourth aspect of the present disclosure includes any preceding aspect, and wherein, the organic compound comprises 3,4-dihydroxyphenethylamine, methyl salicylate, or both.

A fifth aspect of the present disclosure includes any preceding aspect, and wherein, the reaction mixture comprises at least one recycled material.

A sixth aspect of the present disclosure includes any preceding aspect, and wherein, the mineral mixture is derived from seawater.

A seventh aspect of the present disclosure includes any preceding aspect, and wherein, the mineral mixture comprises one or more of calcium, magnesium, lithium, sodium, and potassium.

An eighth aspect of the present disclosure includes any preceding aspect, and wherein, the reaction mixture further comprises inorganic additives, the inorganic additives comprising calcium metasilicate, lithium sulfate, lithium carbonate, kaolin, calcium titanate, calcium nitrate, titanium oxide, sodium tungstates, potassium tungstates, or combinations thereof.

A ninth aspect of the present disclosure includes any preceding aspect, and wherein, the $CO_2$ is present as a gas, a supercritical fluid, or as inorganic carbons.

A tenth aspect of the present disclosure includes any preceding aspect, and wherein, the cementitious material includes precipitated carbonates.

An eleventh aspect of the present disclosure includes any preceding aspect, and wherein, the slurry comprises from 20 to 90 wt. % of the mineral mixture, based on the total weight of the slurry.

A twelfth aspect of the present disclosure includes any preceding aspect, and wherein, the slurry comprises from 10 to 80 wt. % of the $CO_2$, based on the total weight of the slurry.

A thirteenth aspect of the present disclosure includes any preceding aspect, and wherein, the slurry comprises from 10 to 50 wt. % of the organic compound, based on the total weight of the slurry.

A fourteenth aspect of the present disclosure includes any preceding aspect, and wherein, the slurry comprises from 20 to 90 wt. % of the mineral mixture, from 10 to 80 wt. % of the $CO_2$, and from 10 to 50 wt. % of the organic compound, based on the total weight of the slurry.

A fifteenth aspect of the present disclosure includes any preceding aspect, and wherein, the ratio of the organic compound to the mineral mixture is from 10:90 to 90:10.

A sixteenth aspect of the present disclosure includes any preceding aspect, and wherein, curing the slurry comprises heating the cement slurry to a curing pressure of from 200 psi to 2,000 psi and (make ranges) a curing temperature of from 22° C. to 200° C.

A seventeenth aspect of the present disclosure includes any preceding aspect, and wherein, the slurry comprises water and a pH of the water is from 7.8 to 12.

An eighteenth aspect of the present disclosure includes any preceding aspect, and wherein, a method of producing a cementitious material comprises combining a reaction mixture to form a slurry and curing the slurry to form the cementitious material. The reaction mixture comprises a calcium salt, an organic compound, and $CO_2$. The organic compound comprises one or both of 3,4-dihydroxyphenethylamine and methyl salicylate.

A nineteenth aspect of the present disclosure includes any preceding aspect, and wherein, the reaction mixture further comprises $NH_4OH$.

A twentieth aspect of the present disclosure includes any preceding aspect, and wherein, a method of using the cementitious material includes: introducing a casing string into a wellbore, injecting the slurry into an annular region, and curing the slurry to form the cementitious material. Wherein, the casing string comprises casing pipe, the casing string and a wellbore wall of the wellbore define the annular region between the casing string and the wellbore wall, and curing the slurry to form the cementitious material further comprises allowing the slurry to cure within the annular region.

A twenty-first aspect of the present disclosure includes the twentieth aspect, and further comprises: injecting the slurry into a subsurface formation, and wherein curing the slurry to form the cementitious material further comprises allowing the slurry to cure within the subsurface formation.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of producing a cementitious material, the method comprising:
   combining a reaction mixture to form a slurry, and
   curing the slurry to form the cementitious material;
   wherein
   the reaction mixture comprises $NH_4OH$, a calcium salt, an organic compound, and $CO_2$; and
   the organic compound comprises one or both of 3,4-dihydroxyphenethylamine and methyl salicylate.

2. The method of claim 1, wherein the reaction mixture further comprises water.

3. The method of claim 1, wherein the reaction mixture comprises at least one recycled material.

4. The method of claim 1, wherein the mineral mixture is derived from seawater.

5. The method of claim 1, wherein the mineral mixture further comprises one or more of, magnesium, lithium, sodium, or potassium.

6. The method of claim 1, wherein the $CO_2$ is present as a gas, a supercritical fluid, or as inorganic carbons.

7. The method of claim 1, wherein the cementitious material includes precipitated carbonates.

8. The method of claim 1, wherein the slurry comprises from 20 to 90 wt. % of the mineral mixture, based on the total weight of the slurry.

9. The method of claim 1, wherein the slurry comprises from 10 to 80 wt. % of the $CO_2$, based on the total weight of the slurry.

10. The method of claim 1, wherein the slurry comprises from 10 to 50 wt. % of the organic compound, based on the total weight of the slurry.

11. The method of claim 1, wherein the slurry comprises from 20 to 90 wt. % of the mineral mixture, from 10 to 80 wt. % of the $CO_2$, and from 10 to 50 wt. % of the organic compound, based on the total weight of the slurry.

12. The method of claim 1, wherein the ratio of the organic compound to the mineral mixture is from 10:90 to 90:10.

13. The method of claim 1, wherein curing the slurry comprises heating the cement slurry to a curing pressure of from 200 psi to 2,000 psi and (make ranges) a curing temperature of from 22° C. to 200° C.

14. The method of claim 1, wherein the slurry comprises water and a pH of the water is from 7.8 to 12.

15. A method of using the cementitious material of claim 1, comprising:
    introducing a casing string into a wellbore; and
    injecting the slurry into an annular region; and
    curing the slurry to form the cementitious material, wherein:
    the casing string comprises casing pipe,
    the casing string and a wellbore wall of the wellbore define the annular region between the casing string and the wellbore wall, and
    curing the slurry to form the cementitious material further comprises allowing the slurry to cure within the annular region.

16. The method of claim 15, further comprising injecting the slurry into a subsurface formation, and wherein:
    curing the slurry to form the cementitious material further comprises allowing the slurry to cure within the subsurface formation.

17. A method of producing a cementitious material, the method comprising:
    combining a reaction mixture to form a slurry; and
    curing the slurry to form the cementitious material, wherein
    the reaction mixture comprises a mineral mixture, an organic compound, $CO_2$, and $NH_4OH$, and
    the organic compound comprises one or both of 3,4-dihydroxyphenethylamine and methyl salicylate.

18. The method of claim 17, wherein the mineral mixture is derived from seawater or comprises one or more of calcium, magnesium, lithium, sodium, or potassium.

19. A method of producing a cementitious material, the method comprising:
- combining a reaction mixture to form a slurry; and
- curing the slurry to form the cementitious material, wherein
  - the reaction mixture comprises a mineral mixture, an organic compound, $CO_2$, and an ammonium compound,
  - the mineral mixture is derived from seawater or comprises one or more of calcium, magnesium, lithium, sodium, or potassium, and
  - the organic compound comprises one or both of 3,4-dihydroxyphenethylamine and methyl salicylate.

20. The method of claim 19, wherein the ammonium compound comprises $NH_4OH$.

* * * * *